United States Patent [19]
Murakami

[11] Patent Number: 5,846,032
[45] Date of Patent: Dec. 8, 1998

[54] CUTTING INSERT AND CUTTING TOOL

[75] Inventor: Yasunori Murakami, Gifu-ken, Japan

[73] Assignee: Mitsubishi Materials Corporation, Tokyo, Japan

[21] Appl. No.: 672,561

[22] Filed: Jun. 28, 1996

Related U.S. Application Data

[63] Continuation of Ser. No. 396,205, Feb. 28, 1995, abandoned.

[30] Foreign Application Priority Data

| Feb. 28, 1994 | [JP] | Japan | 6-030380 |
| Feb. 28, 1994 | [JP] | Japan | 6-030384 |
| Mar. 3, 1994 | [JP] | Japan | 6-033962 |

[51] Int. Cl.⁶ ................................................ B23B 27/16
[52] U.S. Cl. ........................ 407/102; 407/104; 407/109; 407/110
[58] Field of Search ........................ 407/102, 103, 407/104, 105, 106, 108, 109, 110, 111, 41, 50, 101, 10

[56] References Cited

U.S. PATENT DOCUMENTS

| 3,848,303 | 11/1974 | Faber | 407/105 |
| 4,459,738 | 7/1984 | Buchmann | 407/105 X |
| 4,533,283 | 8/1985 | Satran et al. | 407/111 |
| 4,714,384 | 12/1987 | Lagerberg | 407/109 |
| 5,004,378 | 4/1991 | Arai et al. | 407/104 |

FOREIGN PATENT DOCUMENTS

| 2514882 | 10/1976 | Germany | 407/105 |

*Primary Examiner*—Andrea L. Pitts
*Assistant Examiner*—Henry W. H. Tsai
*Attorney, Agent, or Firm*—Armstrong, Westerman, Hattori, McLeland & Naughton

[57] ABSTRACT

A cutting insert (2) having a tip bit. (5) and a tabular tip body (4) supporting the tip. The cutting insert (2) is used by being mounted to the body (1) of a cutting tool. Wherein, the tip body (4) has a plurality of elastic deformation sections (8) separated by a slit (6) which extends on a transverse line from a corner to an area near another corner. The elastic deformation sections are moved closer together and elastically deformed within a plane which includes the tip body 4 when being mounted to the tool body 1. And, the opposing faces of the elastic deformation sections (8) have engaging sections (10) for engaging the tip bit (5).

20 Claims, 3 Drawing Sheets

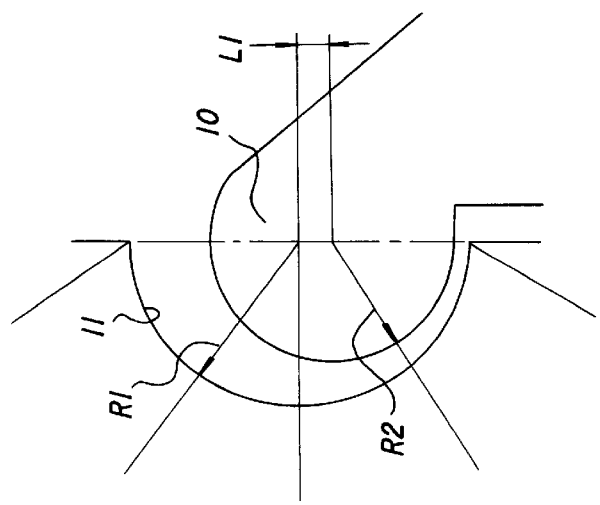
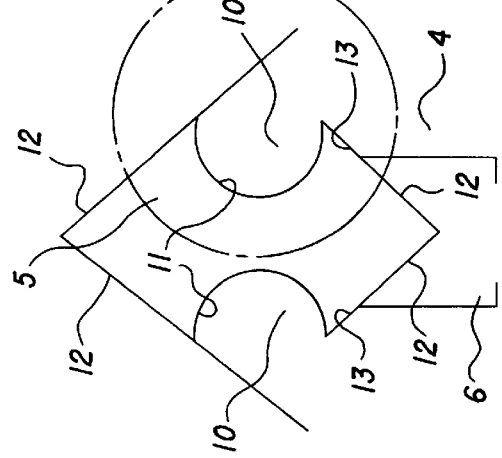
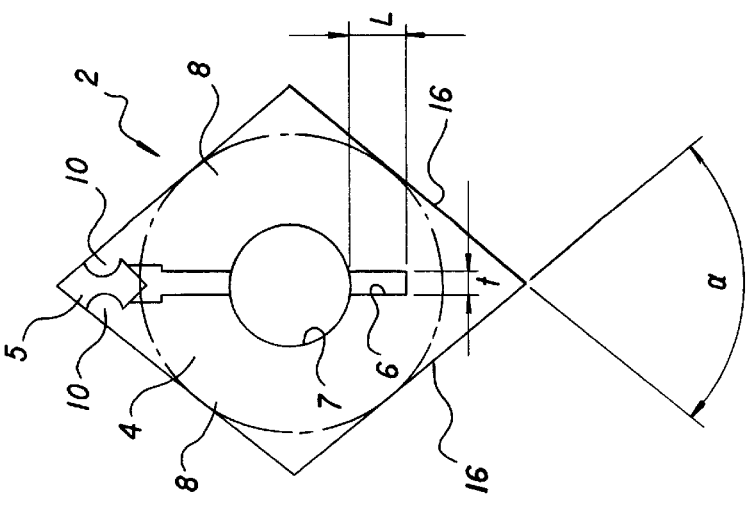

CUTTING INSERT AND CUTTING TOOL

This application is a continuation of application Ser. No. 08/396,205 filed Feb. 28, 1995 now abandoned.

FIELD OF THE INVENTION

The invention relates to a cutting insert formed by mounting a tip bit to a tip body, and to a cutting tool employing this cutting insert.

BACKGROUND OF THE INVENTION

Hitherto, a cutting tool formed by mounting a removable cutting insert to a tool body has been widely used. Examples of such include those constructed with a tip bit (composed of a diamond sintered material such as a polycrystal diamond (PCD) or an ultra-hard sintered material such as polycrystal boron nitride (PCBN)) mounted to a portion of a cemented carbide tip body, or more specifically to a corner of a cutting insert whose general shape is a polygon.

In general, brazing was performed to fix the tip bit to the tip body to form the cutting insert having the above-described construction.

However, in order to obtain a sufficient mounting strength by brazing, attention must be given to such things as, for example, the type of wax material to be used, how to obtain an adequate brazing area, and the conditions for brazing. These factors limit, in various ways, how the tip bit and the tip body can be designed. Even when extreme care has been taken to braze the tip bit to the tip body, since the strength of the brazed portion is less than the strength of the tip bit or the tip body, the life of the cutting insert as a whole depends not on the life of the tip bit or the tip body, itself, but on the life of the brazed section. This required re-brazing of the tip bit to the tip body, which results in increased costs. It is logically possible to only replace the chipped tip bit with a new one and reuse the tip body. However, it is very laborious to braze the reuse the tip body. However, it is very laborious to braze the new tip bit, so that, economically speaking, the entire cutting insert must be replaced.

SUMMARY OF THE INVENTION

It is, therefore, an object of the invention to make it possible to reliably fix a tip bit, made of, for example, PCD or an ultra-hard sintered material such as PCBN, and to make the cutting insert of the invention compatible with currently used cutting inserts.

To these ends, the invention provides a cutting insert having a tip bit and a tabular tip body supporting the tip. The cutting insert is used by being mounted to the body of a cutting tool, wherein the tip body has a plurality of elastic deformation sections which are separated by a slit which extends transversely from a corner to an area near another corner, and are moved closer together and elastically deformed within a plane which includes the tip body by being mounted to the tool body, and wherein the opposing faces of the elastic deformation sections have engaging sections for engaging the tip bit.

According to the cutting insert having the above-described construction, when the aforementioned tip body is mounted to the cutting tool body, elastic deformation of the elastic deformation section allows the tip bit to be fixed to the tip body. Therefore, the tip body can be reused since only the tip bit needs to be replaced, thereby making the cutting insert very economical to use.

The above and other (i) objects, (ii) advantages, (iii) features and (iv) aspects of the present invention will be more readily perceived from the following description of the preferred embodiments thereof taken together with the accompanying drawings and claims.

BRIEF DESCRIPTION OF THE DRAWINGS

The present invention is illustrated by way of example and not limitation in the accompanying drawings, in which like references indicate like parts, and in which:

FIG. 3 is a plan view of the mounted cutting insert of FIG. 1;

FIG. 4 is a detailed view of the tip bit mounting section;

FIG. 5 is an enlarged view of the chain line V of FIG. 4;

DESCRIPTION OF THE PREFERRED EMBODIMENTS

Figure 1:
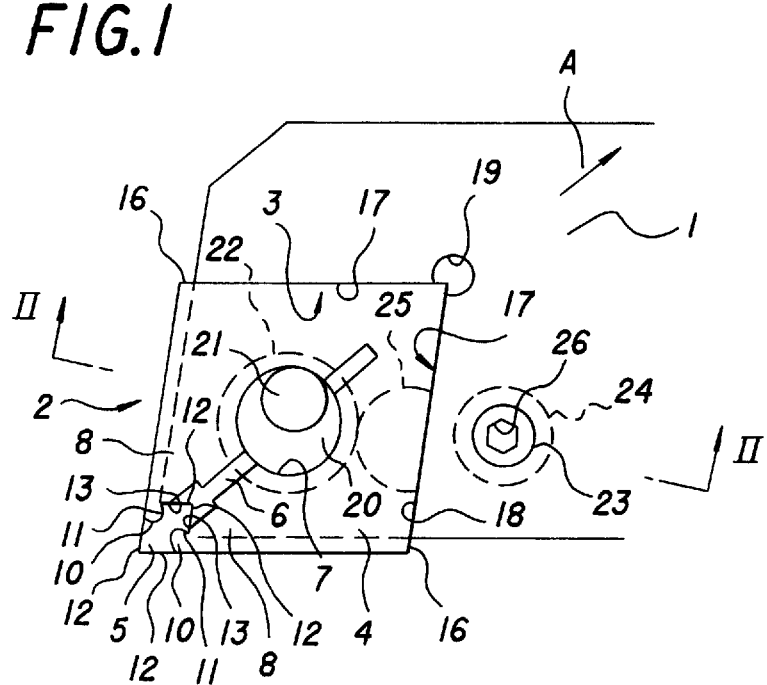
FIG. 1 is a plan view of a cutting insert and cutting tool as an embodiment of the invention.

A detailed description will be given of a cutting insert and a cutting tool of the invention with references to FIGS. 1 through 7 which illustrate an embodiment thereof.

Reference numeral 1 denotes a cutting tool body, which cutting tool is a throw away type of cutting tool in the illustrated embodiment. Cutting insert 2 of the invention is supported at the front end of the cutting body 1 in a tip pocket 3.

The cutting insert 2 comprises a tip body 4 and a tip bit 5 which is supported at the front end of the tip body. The tip body 4 is preferably made of a material with a high hardness value from the viewpoint of wear resistance. However, from the viewpoint of allowing elastic deformation to occur readily, it is preferable that it be made of a material with a relatively low hardness value. In the illustrated embodiment, it is made of a tool steel. Tip body 4, as a whole, is formed into the shape of a quadrilateral, such as the shape of a rhombus. It has a slit 6 extending transversely from a corner where sides of the quadrilateral form an acute angle. A mounting hole 7 for inserting a clamp mechanism (described later) is formed in the center of the aforementioned slit 6 (or the center of the quadrilateral). The tip body 4 virtually aligns with a typical cutting insert, made of a cemented carbide as a whole, which tip is mounted to the tool body 1 for use. The mounting hole 7 is positioned such that it aligns with a mounting hole formed in a typical cutting insert for clamping.

The portions on both sides of the slit 6 are elastic deformation sections 8, capable of moving toward each other and be elastically deformed. The front end of this elastic deformation section 8 has formed engaging sections 10 for clamping tip bit 5.

The tip bit 5 is made of a hard material such as, for example, PCD or PCBN. In the illustrated example, the tip bit 5 is, as a whole, formed into a shape which is generally symmetrical about a center line. Recesses 11 are formed in the center of the tip bit 5 for engaging the aforementioned engaging section 10, with cutting edges 12 formed on both sides of the tip. The cutting edges 12 extend linearly from the front end toward the central portion or recess portions and are in contact with seating faces 13 located at the inner sides of the elastic deformation sections 8 and adjacent to the recess portions 11.

Figure 2:
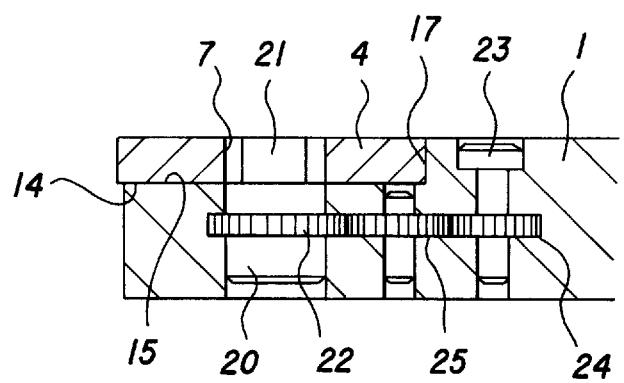
FIG. 2 is a view taken in the direction of the arrows along line II—II of FIG. 1.
Figure 6A:
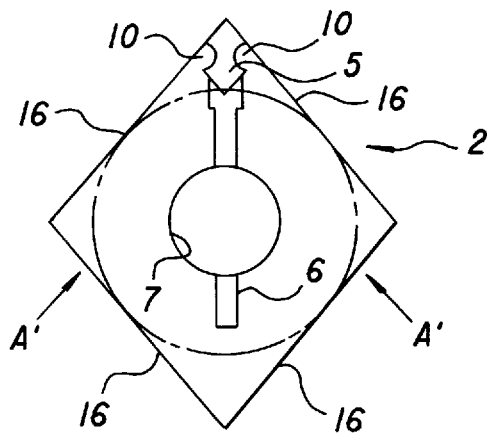
FIGS. 6(a) and 6(b) are explanatory views of the tip body, illustrating a deformed state.
Figure 6B:
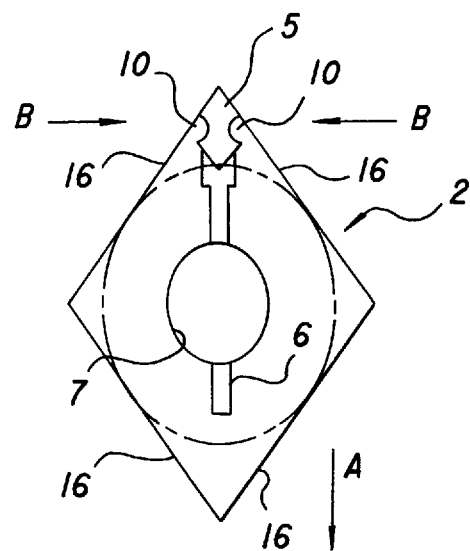

The front end of the tool body 1 is formed with a tip pocket 3 for supporting the tip body 4. As shown in FIG. 2, the tip pocket is delineated by a bearing face 15 which contacts with the bottom surface 14 of the tip body 4 and by bearing faces 17 which are respectively in contact with the two sides 16 of tip body 4. A stress-relieving recess 19 is formed at the corner where the bearing faces 17 meet. The recess 19 receives the corner section of the tip body 4, so as to ensure a reliable contact of protruding section 18 of the tip body.

Next, a description will be made of the clamp mechanism which is used for fixing the tip body 4 to the tool body 1. Reference numeral 20 denotes a shaft 20 which is rotatably supported on the tool body 1. The shaft 20 is disposed such that the center-line of the shaft aligns slightly off center with the mounting hole 7 in the tip body 4. A protrusion 21 is formed at the front end of the shaft 20 away from the center-line of the rotation of the shaft 20. For example, the center-line of the shaft can be located slightly inward along the direction of the slit, e.g. up and to the right of the center of the mounting hole as shown in FIG. 1. As should be readily understood, the relative locations should be sufficient to impart a camming action by protrusion 21 on the mounting hole 7 such as to move the tip body into the inner corner. Therefore, as the shaft 20 rotates, it either moves toward or away from the inner face of the mounting hole 7 in the tip body 4 causing the appropriate clamping or release of the tip body 4.

Next, the driving mechanism which drives the aforementioned shaft 20 will be described. As shown in FIG. 2, a gear 22 is formed around the outer periphery of the shaft 20. Gear 22 is connected through an intermediate gear 25 to a gear 24 which is integral with an operation shaft 23 which is supported by the aforementioned tool body. As shown in FIG. 1, an hexagonal hole 26 is formed in the front end of the operation shaft 23. Inserting an appropriately shaped tool into this hole 26 and rotating it causes the shaft 20 to rotate, such that the protrusion 21 at the front end of shaft 20 is either moved toward or away from the inner periphery of tip body 4. The shaft 20 directly contacts the tip body and is driven through the above-noted gears by positioning the operation shaft 23 at a place which allows effective operation. From the viewpoint of simplifying the construction, the hexagonal hole, or the like, may be formed in the lower end of the shaft 20 (the end of the front side of tool body) to directly operate the shaft.

Next, a description will be made of the operation of the tool having the above-described construction.

First, the tip bit 5 is inserted between the engaging sections 10 of the elastic deformation sections 8 of the tip body 4. Here, the tip bit 5 is clamped (as mentioned above) between the engaging sections 10 of the elastic deformation section 8, so that the tip bit 5 is held by the tip body 4 before it is mounted to tool body 1. Therefore, the tip body 4 and the tip bit as a whole can be handled as one cutting insert.

The cutting insert 2 which is made into an integral structure in this way is placed in the tip pocket 3, and the protrusion 21 is inserted into the mounting hole 7. Then, the appropriate tool can be inserted into the hole 26 to rotate the operation shaft 23 so as to rotate the driving shaft 20, which causes the protrusion 21 to press against the inner side of mounting hole in the direction of the arrow A in FIG. 1. This causes the tip body 4 to move in the same direction as the arrow, with the result that each of the seating faces 17 presses against a respective side face 16 such that they move toward each other. This fixes the tip body 4 in the tip pocket 3.

As the tip body 4 moves in the aforementioned direction, the elastic deformation sections 8 are elastically deformed by being moved toward each other. The engaging sections 10 are inserted into the recess sections 11 of tip bit 5, whereby the tip bit 5 is fixed in the tip body 4. Since each of the engaging sections 10 contact each of the respective recess sections 11 through an inclined face, as the engaging sections 10 move toward each other, the side faces 16 of the tip bit 5 are respectively pressed against the bearing surfaces 17. This positions the tip bit 5 with respect to the tip body 4.

On the other hand, the tip bit 5 is removed by rotating the driving shaft 23 in the direction opposite to that when it was rotated for mounting the tip bit, thereby moving the protrusion section 21 away from the inner side of the mounting hole 7. When this has been done, the tip body 4 is removed from tool body 1. With the tip body 4 removed from the tool body 1, the tip bit 5 is also removed from the engaging sections 10, so that the tip bit 5 can be easily removed from the tip body 4. In the illustrated embodiment, as noted, the tip bit 5 has a shape which is symmetrical about a center-line with cutting blades on opposite edges, so that rotating the tip bit 5 through an angle of 180 degrees and mounting cutting blades on opposite sides so that they can each face the front end allows the tip body to be used again.

The cutting insert and cutting tool having the above-described structure produces the following effects.

Mounting the tip body 4 to the tool body 1 causes the elastic deformation section 8 to elastically deform and, thereby, secure the tip bit 5 to the tip body 4. Accordingly, only the tip bit 5 is changed, so the tip body 4 can be used again, thereby making the cutting insert highly economical.

The engaging sections 10 move toward each other so as to come into contact with the recesses 11 of the tip bit 5. The engaging sections are provided with an inclined section which urges the tip bit in the direction from the aforementioned corner toward the inner side, and a restricting section which contacts the tip bit to restrict the inward movement from the corner to a predetermined position. Therefore, when the clamping sections press against the inclined section of the tip bit, the tip bit is pushed inwardly and comes into contact with the restricting section. This positions the tip bit 5 in place. Accordingly, the removable tip bit 5 can be repeatedly positioned accurately in place.

Near the center of the tip body 4, a part of the slit 6 is made wider to form the mounting hole 7 which passes right through the tip body 4 in the thickness dimension. Therefore, it is possible to use this mounting hole 7 to mount the cutting insert to the mounting body 1 just as a typical cutting insert is mounted. For this reason, this cutting insert 2 can be made compatible with respect to a typical cutting insert.

Since elastic forces of the elastic deformation sections 8, themselves, allow the tip bit 5 to be held between the engaging sections 10, although the cutting insert employs a clamping mechanism, it may be used in various throw away type of cutting tools, just as with conventional cutting inserts.

In mounting the tip body 4 to the tool body 1, the elastic deformation sections 8 are elastically deformed due to the external force applied to tip body 4, whereby the tip bit 5 is held between engaging sections 10. Therefore, with the tip body 4 removed from tool body 1, the clamping force is decreased, so that, for example, in replacing tip bit 5, easier removal of tip bit 5 can be achieved.

The tool body 1 is provided with bearing faces 17, which contact the side faces 16 of the tip body 4 so as to cause the elastic deformation sections 8 to move toward each other and be elastically deformed, and with clamping means, which pushes tip body 4 against these bearing faces. Therefore, pushing the cutting insert 2 against the tip pocket 3 of the tool body 1 by means of clamping means allows the cutting insert to be reliably secured to the tool body 1. Therefore, a cutting tool employing a highly economical cutting insert 2 can be obtained.

In addition, when the side faces 16 of the tip body 4 are brought into contact with the side faces of cutting insert 2, the tip body 4 is pushed against the bearing faces, causing the clamping sections to move toward each other, whereby the tip bit 5 is clamped between these clamping sections. Therefore, the clamping mechanism of a commonly used throw away cutting tool can be used.

The clamping means includes the shaft 20 which is rotatably supported by the tool body 1 and the protrusion 21 which is disposed at the front end of the shaft 20 away from the center of rotation and inserted in mounting hole 7 of tip body 4. Therefore, the rotating shaft 20 brings the protrusion 21 which is disposed away from the center into contact with the inner face of the mounting hole 7, allowing the tip body 4 to be displaced toward the bearing faces.

The shaft 20 of the clamping means is connected to the driving means through a conducting mechanism. The driving means includes an operation shaft 23, which is rotatably mounted to the tool body 1 in parallel with the shaft 20 of the clamping means. The conducting mechanism includes the intermediate gear 25 which is disposed between the gear 22, located about the shaft 20 of the clamping means, and the gear 24, which is located about the operation shaft 23. As discussed, these gears engage one another. Therefore, rotating the operation shaft 23 indirectly rotates the shaft 20, so that an excellent operability of the operating shaft can be realized in accordance with the position of the operating shaft 23.

Next, a detailed description will be given of the dimensional relationships between tip pocket 3 and the aforementioned cutting insert which should be satisfied to allow the tip body 4 to support the tip bit 5.

As illustrated in FIG. 3, an acute angle α formed by a corner of tip body 4 is set such that it is from 15 to 60 degrees greater than an angle β formed by the bearing faces 17. Therefore, when the corner is pressed by the bearing faces, the tip body will reliably be elastically deformed, narrowing the slit, whereby the tip bit can be held more reliably by the tip body.

An angle difference of less than 15 degrees will not necessarily provide a sufficient clamping force in view of the precision in which the bearing faces 17 are processed. On the other hand, when the angle difference is more than 60 degrees, an excess clamping force is provided, and, thus, an excess operating force is used, and the cutting insert 2 or the tool body 1 may be elastically deformed as a result of this.

The width t of the aforementioned slit 6 is set in a range of from 0.5 to 1.0 mm, so that no interference occurs between the wall surfaces on both sides of the slit. There will always be enough rigidity on both sides of the slit. Therefore, the tip bit can be held more reliably by the tip body.

A slit width of less than 0.5 mm causes interference to occur between the walls of slit 6 during elastic deformation, so that an effective clamping force for the tip bit cannot be produced. On the other hand, a width of over 1.0 mm causes the rigidity of the slit to be too low, so that the slit section alone is deformed, thereby preventing an effective clamping force from being obtained.

The length of slit 6 nearer the base end than the mounting hole 7 is set such that the relationship L=2t~6t holds. In additional, the combination of materials used for the tip body and tip bit are selected such that Young's modulus $\epsilon2$ of tip body 4 with respect to Young's modulus $\epsilon1$ is 0.3 $\epsilon1$~0.7 $\epsilon1$. Therefore, the elastic deformation sections provide a sufficient rigidity to allow a sufficient clamping force to be obtained.

A slit length of less than 2t causes the rigidity of the elastic deformation sections 8 to be too high. This prevents the production of clamping forces. On the other hand, when the slit length is more than 6t, the rigidity of elastic deformation sections 8 becomes too low, so that a cutting resistance cannot be opposed to retain the clamping forces. Further, when $\epsilon2$ becomes less than 0.3 $\epsilon1$, the rigidity of the elastic deformation sections 8 becomes too low, so that cutting resistance cannot be opposed to retain clamping forces. On the other hand, when $\epsilon2$ exceeds 0.7 $\epsilon1$, the rigidity of the elastic deformation sections 8 becomes too high, which prevents clamping forces from being produced.

As illustrated in FIG. 5, the radius R1 of the inner peripheries of recess sections 11 of tip bit 5 and the radius R2 of the outer peripheries of the engaging sections 10 are set such that the relationship R2=0.6R1~0.9R1 holds. Therefore, the necessary holding forces can be obtained, without chipping of the cutting edge sections.

When R2 is less than 0.6 R1 the place of contact in relation to R1 becomes too close to the cutting edge, which produces a concentrated stress in the cutting edge and breaks it due to clamping forces. On the other hand, When R2 is greater than 0.9 R1, the place of contact in relation to R1 moves nearer the upper portion of the tip, preventing clamping forces required to clamp the tip from being produced.

The tip body 4 and tip bit 5 are tight-fitted such that an interference of a maximum of 10 microns is produced. Therefore, deformation occurs within a predetermined range when replacing the tips.

When the interference is greater than 10 microns, a significant deformation occurs when replacing the tips, so that difficulties arise when replacing the tips.

Next, an explanation will be given as to why at least α is set such that it is greater than β by 15 to 60 degrees as mentioned above.

Figure 7A:
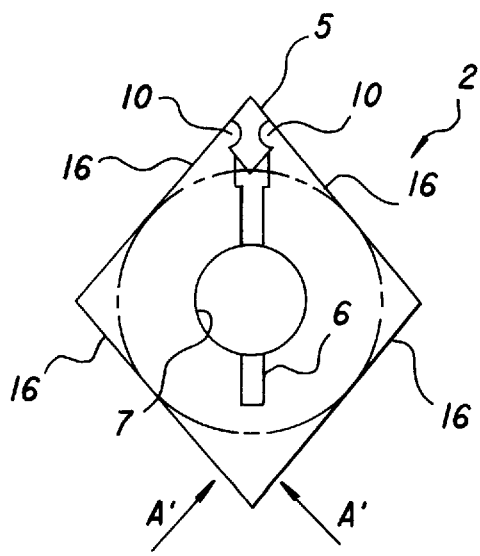
FIGS. 7(a) and 7(b) are explanatory views of the tip body, illustrating a deformed state.
Figure 7B:
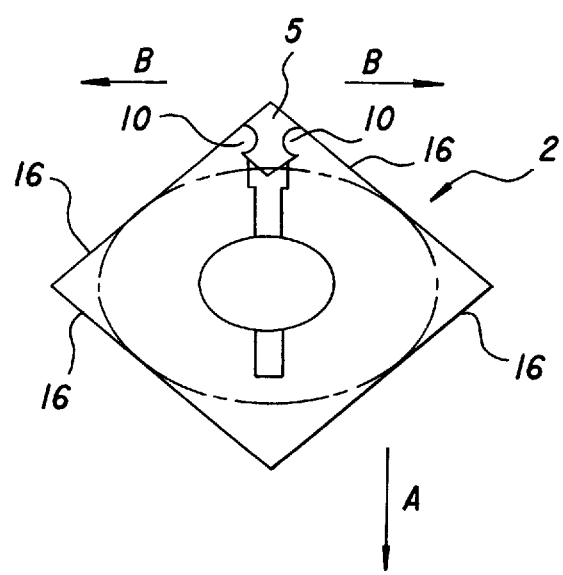

By rotating the aforementioned projection 21, the tip body 4 is moved in the direction A, as shown in FIG. 1. During this movement of tip body 4, if the bearing faces 17 push against the tip body 4 within a range in which slit 6 is present, as shown by the arrows A' of FIG. 6(a), the elastic deformation sections 8 move toward each other and are elastically deformed, as illustrated by the arrows B in FIG. 6(b), whereby the tip bit 5 is supported thereby. On the other hand, when the bearing faces 17 push against the tip body 4 within a range in which the slit 6 is no longer present, as illustrated by arrows A' of FIG. 7(a), the tip body 4 moves and this causes, as shown in FIG. 7(b), the entire tip body 4 to collapse and be deformed along the slit 6. As a result of this, as shown by the arrows B of FIG. 7, the elastic deformation sections 8 move away from each other and are elastically deformed, so that the tip bit 5 can no longer be held thereby.

That is, by setting α and β within the aforementioned ranges allows the tip bit 5 to be reliably held when clamping it to the tip body 4.

The shape of the tip body as viewed from a plane is not limited to the shape of a rhombus as in this embodiment. It may be obviously be shaped into the shape of other quadrilaterals such as parallelograms.

In addition, the tip bit material is not limited to PCD and PCBN. It may be made of other materials such as cemented carbides as the tip body. It is also obvious that the tip body material is not limited to tool steel.

In the embodiment, the slit was formed such that it extends beyond the center of the tip body (mounting hole for the clamping). Obviously, however, as long as the required elastic deformation occurs, the slit may be formed shorter in length. For example, it may be formed such that it extends up to the aforementioned center or such that it does not extend up to the center.

The detailed construction of the tip clamping mechanism is not limited to that in which a cam shaft is driven through gears as in this embodiment. For example, in the clamping system, the cam shaft may be directly operated without the use of gears; or clamping may be performed while bringing the cutting insert into close contact with the bearing faces positioned vertically.

In addition, in the above discussed construction of the cutting insert, the tip bit 5 is held between the engaging sections 10, at the recess sections 11 (which are formed at the central portion of the tip bit 5 for engaging the tip bit with the engaging sections 10), and by an elastic deformation of the elastic deformation sections 8 due to forces causing elastic deformation thereof and to external forces applied thereto. However, in another embodiment, the tip bit may be inserted between the engaging sections 10 and brazed together. In this construction, the tip bit 5 is brazed firmly to the engaging sections 10 of the tip body 4. Therefore, when the tip body 4 is pressed by the bearing faces 17, the slit 6 still causes the elastic deformation sections 8 to be elastically deformed. Thus, with the engaging sections 10, the fixing force can be made even stronger than that obtained by brazing. In addition, the tip bit 5 and the tip body 4 are brazed together at the elastic deformation sections 8. Therefore, replacement is made easier because only the tip bit 5 needs to be removed.

Further, at least a part of the engaging sections 10 aligns with the contour of the tip bit 5, which results in a more precise positioning of the tip bit 5 and a larger brazing area. This increases the brazing strength and leads to a more precise positioning of the tip bit.

While the instant invention has been shown and described with specific reference to embodiments presently contemplated as the best mode of carrying out the invention in actual practice, it is understood that various changes may be made in adapting the invention to different embodiments without departing from the broader inventive concepts disclosed herein and comprehended by the claims which follow.

What is claimed is:

1. A cutting insert for use by being mounted on a body of a cutting tool, comprising:
    a tip bit having opposed recesses in an outer periphery thereof, said opposed recesses extending through said tip bit from a top surface of said tip bit to a bottom surface of said tip bit;
    a tabular tip body supporting said tip bit, wherein said tip body has a plurality of elastic deformation sections, which are separated by a slit, said slit extending transversely from a first outer corner of said tip body to an area near a second opposing outer corner of said tip body, and said elastic deformation sections being movable closer together and being elastically deformed within a plane which includes said tip body mounted on said body of said cutting tool;
    wherein opposing faces of said elastic deformation sections have engaging sections for engaging said opposed recesses of said tip bit; and
    wherein said tip bit supported on said tip body forms an essentially parallelogram-shaped cutting insert for mounting on said body of said cutting tool.

2. The cutting insert of claim 1, wherein said engaging sections are provided with an inclined section, which urges inwardly said tip bit from said outer corner when moved closer together, and restricting sections, which restrict inward movement of said tip bit by contacting said tip bit at a predetermined position.

3. The cutting insert of claim 1, wherein a part of said slit is made wider at a portion around a center of said tip body to form a mounting hole which passes through said tip body in a thickness dimension of said tip body.

4. The cutting insert of claim 2, wherein a part of said slit is made wider at a portion around a center of said tip body to form a mounting hole which passes through said tip body in a thickness dimension of said tip body.

5. The cutting insert of claim 1, wherein said tip bit is held between said engaging sections by elastic forces of said elastic deformation sections themselves.

6. The cutting insert of claim 2, wherein said tip bit is held between said engaging sections by elastic forces of said elastic deformation sections themselves.

7. The cutting insert of claim 1, further comprising means for elastically deforming said elastic deformation sections by external forces applied to said tip body when said tip body is mounted to said tool body to allow said tip bit.

8. The cutting insert of claim 2, further comprising means for elastically deforming said elastic deformation sections by external forces applied to said tip body when said tip body is mounted to said tool body to allow said tip bit.

9. The cutting insert of claim 1, wherein said engaging sections and said tip bit are brazed to each other.

10. The cutting insert of claim 2, wherein said engaging sections and said tip bit are brazed to each other.

11. A cutting tool, comprising:
    (a) a cutting insert including:
        a tip bit having opposed recesses in an outer periphery thereof, said opposed recesses extending through said tip bit from a top surface of said tip bit to a bottom surface of said tip bit;
        a tabular tip body supporting said tip bit, wherein said tip body has a plurality of elastic deformation sections which are separated by a slit, said slit extending transversely from a first outer corner of said tip body to an area near a second opposed outer corner of said tip body, and said elastic deformation sections being movable closer together and being elastically deformed within a plane which includes said tip body by being mounted to said tool body;
        wherein opposing faces of said elastic deformation sections have engaging sections for engaging said opposed recesses of said tip bit; and
    wherein said tip bit supported on said tip body forms an essentially parallelogram-shaped cutting insert for mounting on said body of said cutting tool; and
    (b) a body of said cutting tool, wherein said cutting insert is mounted on a front end of said body of said cutting tool, wherein said body of said cutting tool includes bearing faces which contact side faces of said tip body such that said elastic deformation sections are elastically deformed and are moved closer together, and wherein said body of said cutting tool also includes clamping means for pressing said tip body against said bearing faces.

12. The cutting tool of claim 11, wherein said bearing faces include a first bearing face and a second bearing face which contact two of said side faces which intersect at said another corner, respectively, and wherein said clamping means moves said tip body to said bearing faces, in which direction said two side faces are moved closer together.

13. The cutting tool of claim 11, wherein said clamping means includes (a) a shaft which is rotatably supported on said tool body and (b) a clamp protrusion disposed away from a center of rotation of said shaft and at a front end of said shaft, said clamp protrusion having a portion which is inserted into a mounting hole in said tip body.

14. The cutting tool of claim 13, wherein said shaft of said clamping is connected to a driving means through a conducting mechanism, wherein said driving means is rotatably mounted to said tool body in parallel to said shaft of said clamping means and has a driving shaft with a fitting section for connecting to a working tool; and wherein said conducting mechanism has a plurality of gears which engage one another and which are engageable between said shaft of said clamping means and said driving shaft.

15. The cutting tool of claim 11, wherein an angle ($\alpha$) at said second opposed outer corner of said tip body is between 15 to 60 degrees greater than an angle ($\beta$) formed by said bearing faces.

16. The cutting tool of claim 11, wherein a width (t) of said slit measures from 0.5 mm to 1.0 mm.

17. The cutting tool of claim 16, wherein a length (L) of said slit extending from a mounting hole toward an end portion is from two to six times larger than said width (t).

18. The cutting tool of claim 11, wherein a Young's modulus of said tip body is from 0.3 to 0.7 times a Young's modulus of said tip bit.

19. The cutting tool of claim 11, wherein said engaging sections have protrusions with cylindrically shaped outer peripheries, and wherein said tip bit has recesses with cylindrical faces for receiving said engaging sections, and wherein a radius (R2) of said cylindrical faces of said engaging sections is from 0.6 to 0.9 times a radius (R1) of said cylindrical faces of said recesses.

20. The cutting tool of claim 11, wherein said elastic deformation sections and said tip bit are tight-fitted such that an interference therebetween has a maximum of 10 microns.

* * * * *